Sept. 1, 1959 C. A. HEILAND 2,902,331
RECORDING APPARATUS
Filed April 20, 1953 3 Sheets-Sheet 2

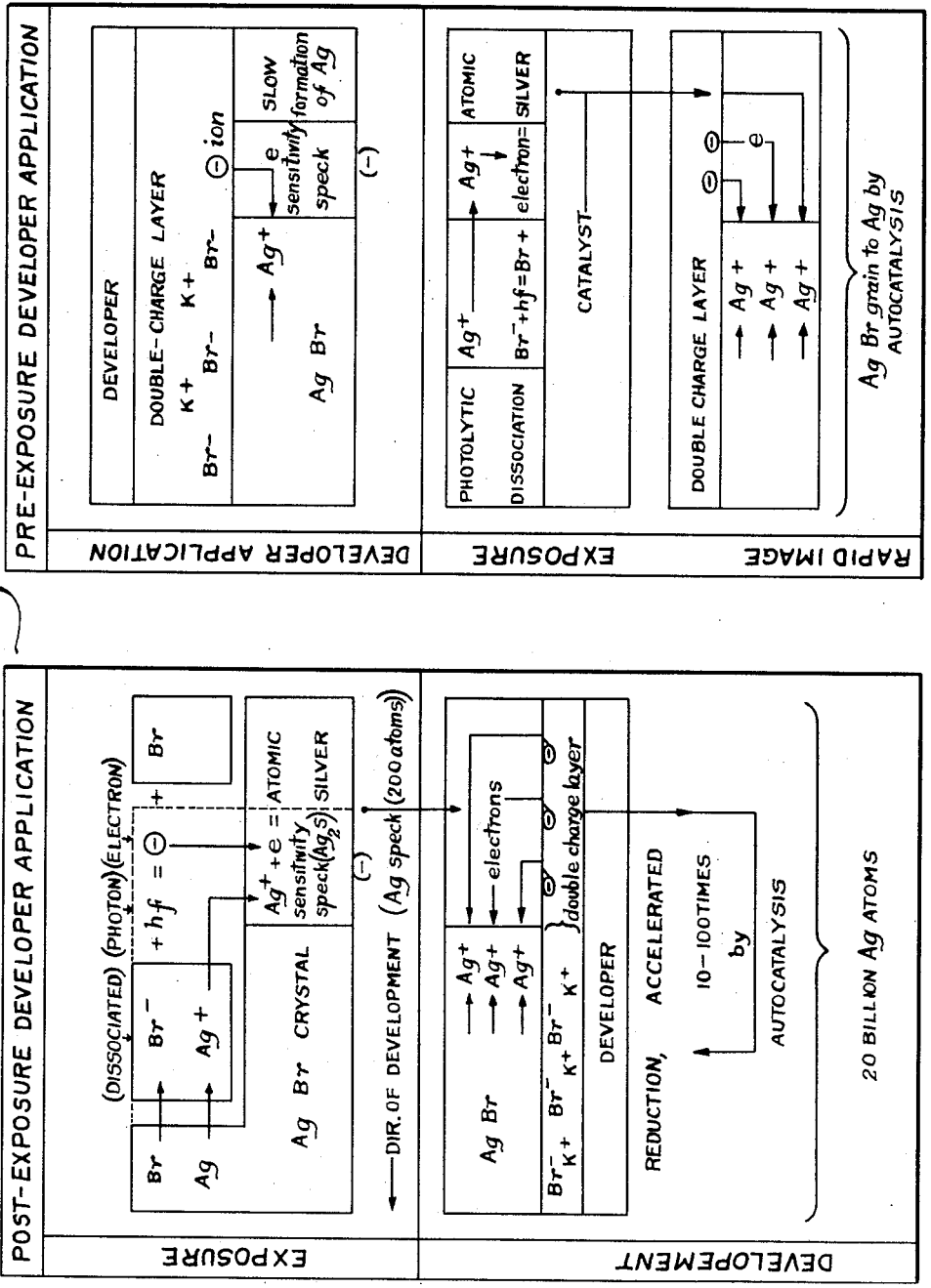

INVENTOR.
Carl A. Heiland
BY
Smith, Olsen & Baird,
Atty's.

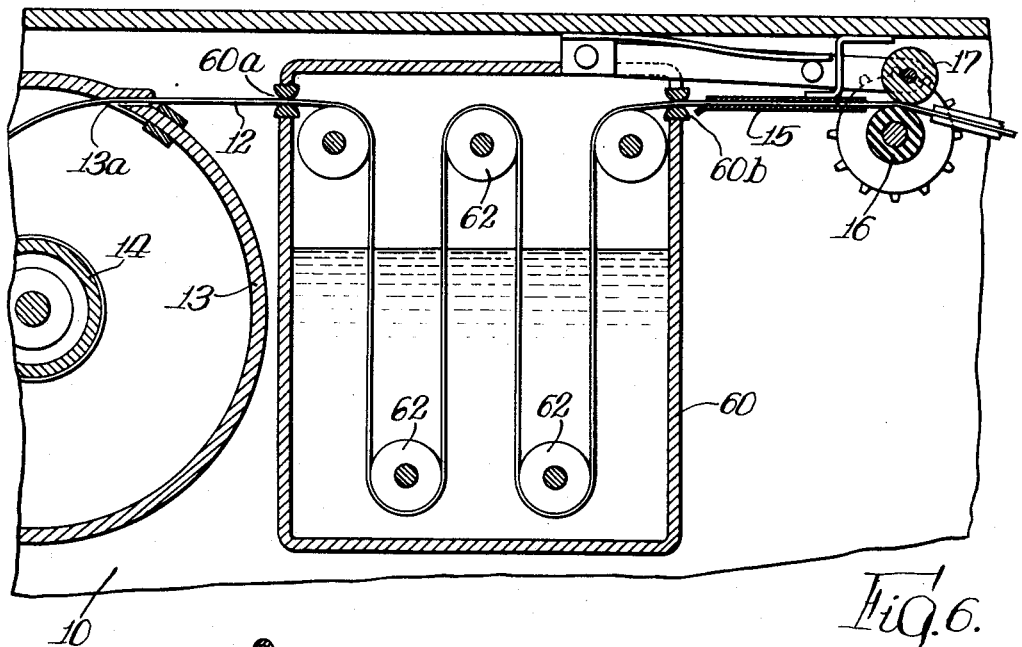
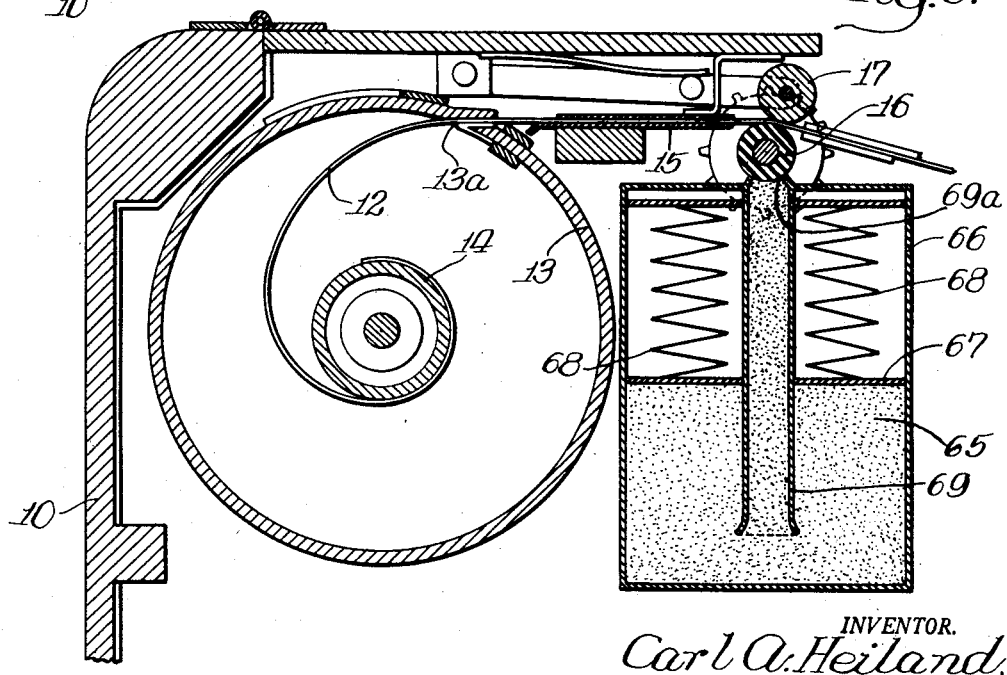

United States Patent Office 2,902,331
Patented Sept. 1, 1959

2,902,331

RECORDING APPARATUS

Carl A. Heiland, Golden, Colo., assignor, by mesne assignments, to Minneapolis-Honeywell Regulator Company, Minneapolis, Minn., a corporation of Delaware Application April 20, 1953, Serial No. 349,767

1 Claim. (Cl. 346—108)

This invention relates to a method and apparatus by which an immediately visible record of any recordable phenomenon may be produced and the present invention is an improvement upon that described and claimed in United States Letters Patent No. 2,580,427, granted to me on January 1, 1952.

In said Letters Patent there is disclosed a recording system by which an immediately visible record of the time variation of electrical phenomena is produced with the use of invisible radiation beams. The underlying principle of this system is a phenomenon of resonance of the spectral response of the recording medium with the specific emission of a radiation source used for recording by virtue of the coincidence in wave length of source emission and medium response. Maximum response amplitudes can be produced which yield the greatest possible amount of photochemically generated materials in the shortest possible period of time.

Practical experience with various sources of infrared and ultraviolet radiations and with various types of recording media indicates that certain limitations are imposed on this technique insofar as recording speeds are concerned. To produce an immediately visible trace, it is necessary to use fairly high intensities of the radiation source because of the relatively limited apertures of the lenses and mirrors in a recording system having a desired electrical response. Practical considerations make it desirable to keep the size and power consumption of the radiation source below a certain limit. I have found that in recording instruments employing the principle of spectral resonance, the recording speeds that can be obtained with the use of infrared and ultraviolet radiations with optical systems of practical dimensions are of the order of several inches per minute.

In considering the solution of the problem of producing an immediate trace at higher recording speeds, it is desirable to revert to the fundamental problem involved in the production of a trace by the use of the majority of recording instruments. In such an instrument by which an immediate trace is produced by a pointer affixed to the recording element, the pointer is provided with a pen, or is printing intermittently or is heated or charged electrically when used in connection with electro-sensitive paper. While such recorders are capable of producing an immediate trace, higher writing speeds are attainable only by the use of pointers having no inertia such as beams of light employed in conventional recorders or the electron beams employed in cathode-ray recorders. In such instruments, a latent image of the trace is usually formed on a suitably sensitized photographic emulsion which is brought out by subsequent development. Thus in instruments having higher writing speeds where a latent image is formed, it is necessary to supplement the primary recording energy contained in a light beam by the secondary energy of a subsequent photochemical reaction which will then bring out the trace. It is apparent that higher writing speeds appear to be obtainable only by the application of some form of secondary energy.

It is the purpose of the present invention to provide a method and apparatus by which the required secondary energy is modified in such a manner that the trace or image becomes visible immediately upon exposure. In principle, the invention is based on the catalysis of pre-exposure development. By applying the developer to the sensitized medium in advance of the exposure, the trace is immediately visible when the exposure is made and higher recording speeds are thereby made possible.

The nature of the invention will be understood from the following specification taken with the accompanying drawings in which certain features of the principles of post-exposure and pre-exposure development are schematically illustrated together with preferred forms of novel apparatus by which the present invention may be practiced. In the drawings, Figure 1 is a schematic diagram illustrating the mechanism of post-exposure development as applied to a particular photographic emulsion;

Fig. 2 is a schematic diagram illustrating the mechanism of catalyzing the pre-exposure development of a sensitized medium according to the present invention;

Fig. 5 shows a vertical section through a modified form of apparatus, illustrating another method of applying the developing agent to the recording medium or film prior to exposure; and Fig. 6 shows a vertical section through another form of apparatus for applying to the recording film a developing agent in the form of a paste or emulsion.

Figure 3:
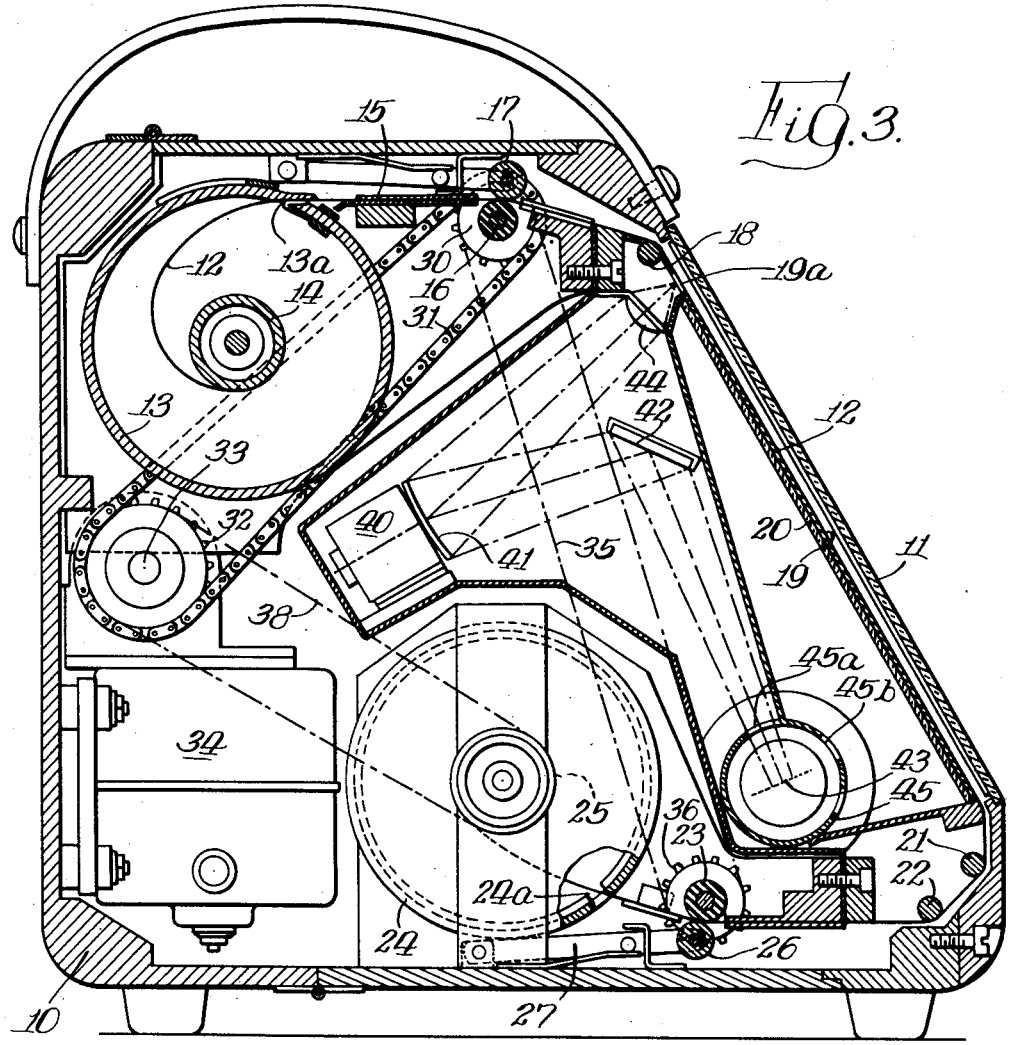
Fig. 3 illustrates a vertical section through a novel form of recording instrument, constructed according to the present invention, which may be employed in the practical application of the pre-exposure development principle.

As a preliminary to a more detailed description of the present invention, the principles of post-exposure development as presently understood will be briefly reviewed with reference to Fig. 1 and in connection with the use of a photographic emulsion consisting essentialy of a gelatine containing crystals of silver bromide. According to present concepts of development, a so-called sensitivity speck of silver sulfide may be attached to the crystal and serve as a nucleus of development. When light strikes the silver bromide crystal, a portion of its molecules will become dissociated and positively charged silver ions and negatively charged bromine ions will be formed. Each negatively charged bromine ion will acquire a photon whereby it is split into a neutral bromine atom and an electron. The electron will migrate to the sensitivity speck and impart thereto its negative charge. Thereupon positive silver ions will be attracted to the electron and combine therewith to form atomic silver. It is believed that the sensitivity speck will then be covered with atomic silver and that the latent image in a silver bromide crystal will be of the magnitude of some 200 atoms of silver.

If a developing solution be then applied it is believed that a chemical complex is formed adjacent to the surface of the crystal and attaches itself to the crystal in the form of a double charged layer. From this layer the sliver speck is believed to acquire negative ions and thereby electrons which will attract positive silver ions and combine therewith to form atomic silver. An important feature of the reaction is that it is accelerated by the catalysis resulting from the silver which may be termed autocatalysis since the progressively formed silver acts as a catalyzer. By this process, the amount of silver is enlarged considerably in avalanche proportions and the entire grain will be converted to atomic silver. The now visible image may be assumed, for illustration, to contain 20 billion atoms of silver formed by the development process from 200 atoms of silver present in the latent image. This phenomenon has been illustrated diagrammatically in Fig. 1 which is believed to be clear without further explanation.

The present invention makes use of this phenomenon of catalysis and autocatalysis to initiate or "trigger" the silver avalanche and thereby produce an immediately visible trace by applying the developer before the exposure. This is a novel technique and directly contrary to the teachings of photographic development since the beginning of that art. Nevertheless, it has now been found that an immediate image can be produced by the process here disclosed.

The mechanism of this pre-exposure development process is illustrated somewhat schematically in Fig. 2. In the practice of this process, the sensitive emulsion containing silver bromide crystals is treated prior to exposure with the developing agent, allowing sufficient time for the chemical complex with the double-charge layer to form in the immediate vicinity of the crystals. The sensitivity speck will attract a moderate quantity of negatively charged ions and acquire a slight negative charge by the elections thus formed and, at the same time, some positive silver ions will be attracted from the crystal and some atomic silver will be slowly formed.

When a light of sufficient intensity now strikes the crystal, its molecules will become dissociated, as previously set forth, and electrons will be generated in the sensitivity speck by the split-up of the bromine ion and the electron with the result that the electrons will combine with positive silver ions and form atomic silver. This silver catalysis causes the developer action which now proceeds in an accelerated manner due to the autocatalysis of the atomic silver which is progressively formed. The action which occurs is that an avalanche of silver is produced in the presence of the developer by the exposure and either the surface portion or the entire body of each silver bromide crystal is converted to silver with extreme rapidity.

The essence of the invention, therefore, lies in the pre-exposure application of a developer to a photosensitive recording medium. The scope of the invention is not limited, however, to operations carried on with photographic emulsions since the pre-exposure application of a developer to produce an immediate image may be employed with other development processes, such as the physical development of photographic emulsions, the development of diazo compounds by suitable couplers, and the like.

Before proceeding with a more detailed description of the present invention, further consideration will be given to the theory of post-exposure development as it has been worked out for photographic emulsions. In conventional development, the growth of negative density with time is given by the Hurter equation $$D = D\infty(1 - e^{-kt})$$

in which D is the density at the time $t$, D is the density eventually obtainable, and $k$ is a so-called velocity factor. From this equation it appears that $k$ is shown by the following equation:

$$k = \frac{1}{t} \log_e \frac{D\infty}{D\infty - D}$$

By differentiation of the Hurter equation, the speed of development is seen to be dependent upon the velocity factor, thus:

$$\frac{dD}{dt} = k(D\infty - D)$$

In the application of the pre-exposure development principle, it is desirable to make use as far as possible of established methods for increasing the velocity factor $k$ by adequate developer concentration $c$ as indicated by the formula $$\text{amount adsorbed} = k\sqrt{c}$$

while keeping in mind the fact that a further increase of the velocity factor is attainable by processing at an elevated temperature.

One of the principal advantages of the pre-exposure application of the developing agent is that the so-called "induction" time for the initiation of the development is either reduced or can be made zero. This induction time is required for the gelatine to soak up the developer before it can act upon the silver bromide grains and this time is not reflected in the formulae given above. Making allowance for the induction delay $t_0$, these relations are indicated by the Sheppard equation, as follows:

$$k(t - t_0) = \log_e \frac{D\infty}{D\infty - D}$$

or by the more empirical Nietz equation:

$$k(\log t - \log t_0) = \log \frac{D\infty}{D\infty - D}$$

which by differentiation gives the velocity of development:

$$\frac{dD}{dt} = \frac{k}{t}(D\infty - D)$$

in which the development time appears. This indicates that the development velocity is greatest with short development times. In conventional development, the development time is shortened by suitable concentration and temperature; therefore, to make the trace attain its final density as rapidly as possible, it is desirable in pre-exposure development to take appropriate steps in that direction.

Tests which I have conducted with pre-exposure developer applications indicate that with a suitable selection of recording materials and developers an instantaneous trace appearance can be accomplished. With immediate trace development substantially increased writing speeds are attainable, particularly when the principles of spectral resonance of source emission and medium response are combined with the idea of pre-exposure developer application.

It is desirable to observe a number of precautions in the pre-exposure application of the developer, as follows: (1) the developer should be applied sufficiently ahead of the exposure to bring the induction time down to zero; (2) the developer should not remain in such extended contact with the emulsion as to produce excessive chemical fog or weakness in the supporting base; (3) the amount of free silver in the emulsion must be practically nil to avoid development without exposure; and (4) any light or radiation to which the recording medium is sensitive must be excluded from the emulsion during the pre-exposure application of the developer in order to prevent any catalytic reaction from photolytic silver.

An instrument constructed according to the present invention to carry out the novel pre-exposure development principle disclosed above is illustrated in Fig. 3. This apparatus comprises a casing 10 provided with a hinged access door and transparent observation window 11. The recording medium 12 in the form of a film or photographic paper is coiled up in spiral fashion in a light-tight magazine 13 and is withdrawn therefrom through an exit slot 13a extending parallel to the axis of the drum 14 on which the film is wound. From the slot 13a the film 12 passes over a guide 15 and then over a power actuated drive roller 16 with which it is held in contact by an idler roller 17. From the drive roller 16, the film or recording medium passes over a roller 18 and thence downwardly over an apron 19 which, through most of its length, is occupied by a filter 20. The film 12 passes from the apron 19 around two rollers 21 and 22 and then under a power driven roller 23 from which it extends into the take-up magazine 24 where it is wound on a power driven drum 25. The drum is provided with a longitudinal slot 24a through which the film passes and the film is maintained in contact with the feed roller 23 by an idler roller 26 mounted on a spring pressed pivoted bracket 27.

The drive roller 16 is mounted on a shaft having fixed thereon a sprocket gear 30 driven by a sprocket chain 31 from a sprocket gear 32 fixed on a drive shaft 33 which is actuated by a motor 34. The roller 23 is driven by a sprocket chain 35 extending around the sprocket gear 36 fixed on its shaft and also around a sprocket gear fixed on the shaft of the drive roller 16. The drum 25 is driven through a take-up clutch by a sprocket chain 38 extending around a sprocket gear fixed on the drive shaft 33.

An indicating system is illustrated somewhat schematically in Fig. 3 as comprising an electromagnetic coil 40 having a mirror armature 41 to which there is reflected by a stationary mirror 42 the light beams or invisible radiations of high intensity passing thereto from a source 43. From the mirror armature 41 the beams or radiations pass to the cylindrical lens 44 which concentrates the rays upon a spot in the opening 19a in the apron where they impinge upon the film 12.

The radiation source 43 is surrounded by a housing 45 having one opening 45a, which permits the passing of light beams or radiations to the mirror 42, and another opening 45b which directs light beams or radiations to the filter 20 to permit the viewing of the record on the film as the making of the record proceeds.

Figure 4:
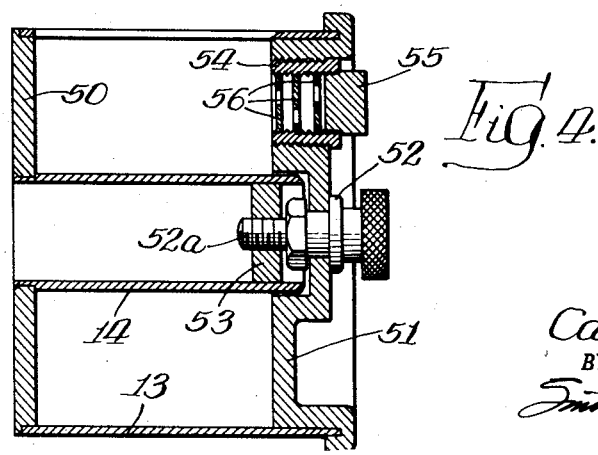
Fig. 4 shows a sectional view through the supply magazine for the recording apparatus shown in Fig. 3 modified to illustrate one method of applying the developing solution to the medium prior to exposure.

In Fig. 4 there is shown one form of apparatus which may be employed to apply the developing agent to the recording medium prior to exposure. As there illustrated, the supply magazine 13, also shown in Fig. 3, which contains the drum 14, is closed at one end by a wall 50 and is provided at the other end with a removable head 51 having a fluid tight engagement therewith. This head is secured in closed position and moved axially by a rotatable operating member 52 having a rotatable interlocking engagement with the head 51 and having a threaded extremity 52a which engages a threaded aperture in a disk 53 fixed in the drum 14. The head 51 had a reversely turned flange which embraces the end of the annular wall of the magazine and the endwise movement of the head is readily effected by rotation of the member 52 either to remove the head or to secure it in closed position. The head 51 is provided with an aperture in which there is mounted an internally threaded sleeve 54 which forms an opening through which the developing agent may be poured into the magazine containing the film. This opening is normally closed by a removable threaded plug 55 and it is provided with a number of spaced baffle disks 56 having staggered holes therein so that they permit the entry of the developing fluid without admitting light when the plug is removed.

The take-up magazine 24 may be constructed in a manner similar to the construction of the magazine 13 so that an acid-stop solution may be introduced into the magazine 24 to terminate development. This solution may be subsequently replaced by a fixing solution. In this manner, the entire operation of the instrument may be performed in daylight after which the only remaining step is to remove the film or paper from the magazine 24 and rinse it.

In Fig. 5 there is shown a modified form of apparatus which may be employed in conjunction with the apparatus illustrated in Fig. 3 to apply the developing agent to the film before exposure. In this form the dry film or paper bearing the sensitive emulsion is drawn from the magazine 13 in the manner previously described and is extended into a housing 60 containing the developing agent in liquid form. This housing is provided with entrance and exit slots 60a and 60b, respectively, which are closely fitted by the film as it enters the housing and emerges therefrom, and it is located between the magazine and the guide 15. Within the housing 60 the film 12 is immersed in the developing agent as it passes in zigzag fashion around a plurality of rollers 62 while in complete darkness. The same arrangement of apparatus may be used for a fixing bath.

Another arrangement of apparatus for applying the developing agent to the recording medium in advance of the exposure thereof is shown in Fig. 6. This form of apparatus is adapted for use with the instrument shown in Fig. 3 and is capable of applying the developing agent in the form of a paste or thick emulsion while in complete darkness. The developing agent 65 is contained in the lower part of a vessel 66 which is mounted adjacent the magazine 13 and beneath the drive roller 16. A piston 67 is pressed downwardly by springs 68 against the developing paste 65 and presses it upwardly through the central discharge tube 69 which has its mouth 69a opening at the surface of the drive roller 16 (or any other roller bearing on the film 12) so that the roller is coated with the developing paste which is transferred thereby to the film prior to exposure.

The pre-exposure development principle may be applied to other forms of recording methods and instruments using either visible light or invisible radiations, either in the ultraviolet or the infrared, thereby enhancing the intensity and rapidity of the response of the recording medium. Although the invention has been disclosed in connection with certain forms of apparatus and with the explanation of particular examples, it will be understood that both the method and the apparatus may be modified in various ways without departing from the scope of the appended claim.

I claim:

The combination in apparatus for recording an image on a sensitized medium, of supply means for said sensitized medium, means for withdrawing said sensitized medium from said supply means, means for exposing said sensitized medium to rays carrying the image to be recorded and transmitted from a source to the emission of which said medium is sensitized, a vessel for containing a developing agent in the form of a paste, a roller in advance of said exposure means having a portion continually in engagement with said sensitized medium and a portion in continuous contact with the paste in said vessel for covering the sensitized medium therewith during travel of the medium past the roller, a spring urged piston, and a tube communicating through the piston and between the portion of the vessel containing the paste and said roller, the construction and arrangement being such that paste is forced through the tube onto the roller by the piston.

References Cited in the file of this patent

UNITED STATES PATENTS

| 2,406,152 | Levine | Aug. 20, 1946 |
| 2,653,527 | Land | Sept. 27, 1953 |

FOREIGN PATENTS

| 399,183 | France | Apr. 15, 1909 |
| 814,449 | France | Mar. 15, 1937 |